United States Patent [19]

Nakamura et al.

[11] Patent Number: 5,006,610
[45] Date of Patent: Apr. 9, 1991

[54] COMPOSITION OF AROMATIC POLYESTER, MODIFIED POLYPHENYLENE ETHER AND DIGLYCIDYL DICARBOXYLATE

[75] Inventors: Kiyokazu Nakamura; Kiichi Kometani, both of Nagoya; Akihiko Koshino, Obu; Kenjiro Horiuchi, Oaza-Usaka, all of Japan

[73] Assignee: Toray Industries, Inc., Tokyo, Japan

[21] Appl. No.: 350,507

[22] Filed: May 11, 1989

Related U.S. Application Data

[63] Continuation of Ser. No. 189,314, Mar. 31, 1988, abandoned.

[30] Foreign Application Priority Data

Aug. 4, 1986 [JP] Japan ............... 61-181881
Oct. 2, 1986 [JP] Japan ............... 61-235297
Oct. 9, 1986 [JP] Japan ............... 61-240358

[51] Int. Cl.⁵ .................. C08L 67/02; C08L 71/04
[52] U.S. Cl. .................. 525/396; 525/65; 525/109
[58] Field of Search .................. 525/396, 397

[56] References Cited

U.S. PATENT DOCUMENTS

| | | | |
|---|---|---|---|
| 4,010,219 | 3/1977 | Aoyama et al. | 524/114 |
| 4,405,766 | 9/1983 | Bertram et al. | 525/507 |
| 4,456,719 | 6/1984 | Yamamoto et al. | 524/114 |
| 4,614,773 | 9/1986 | Sugio et al. | 525/396 |
| 4,732,937 | 3/1988 | Sybert | 525/396 |
| 4,792,586 | 12/1988 | Han | 525/92 |
| 4,806,297 | 2/1989 | Brown et al. | 525/92 |

FOREIGN PATENT DOCUMENTS

| | | |
|---|---|---|
| 0148774 | 7/1985 | European Pat. Off. |
| 121760 | 6/1987 | Japan |
| 87-00850 | 2/1987 | World Int. Prop. O. .......... 525/396 |

Primary Examiner—Melvyn I. Marquis
Assistant Examiner—Robert E. L. Sellers, II
Attorney, Agent, or Firm—Miller, Austin R.

[57] ABSTRACT

A resin composition comprising 100 parts by weight of a polyester composition comprised of
(A) 5–95% by weight of an aromatic polyester, and
(B) 95–5% by weight of a polyphenylene ether having a repeating unit of

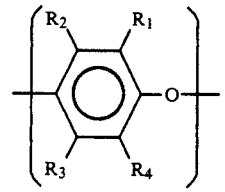

and/or a modified polyphenylene ether obtained by reacting 0.05–20% by weight of an active functional group containing monomer to said polyphenylene ether, and
(C) 0.05–30 parts by weight of an epoxy compound represented by the formula

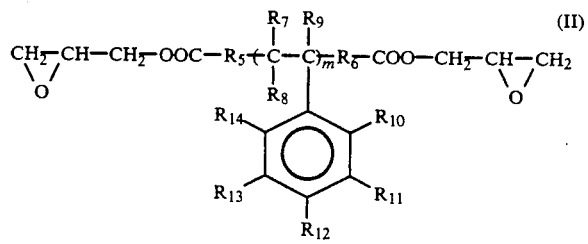

is superior in moldability and dimensional stability, and its molded article is distinguished in mechanical property and solvent resistance.

9 Claims, No Drawings

COMPOSITION OF AROMATIC POLYESTER, MODIFIED POLYPHENYLENE ETHER AND DIGLYCIDYL DICARBOXYLATE

This is a continuation of application Ser. No. 189,314 filed Mar. 31, 1988, now abandoned.

FIELD OF ART

The present invention relates to a resin composition being superior in surface appearance of molded article and mechanical properties including impact resistance as well as moldability, dimensional stability and solvent resistance.

BACKGROUND

Aromatic polyesters represented by polybutylene terephthalate and polyethylene terephthalate are excellent in mechanical property, electrical property and solvent resistance and are thus extensively used for applications to automobile parts, electrical and electronic parts and other mechanical parts. However, aromatic polyesters have problems in that they are low in heat deflection temperature under load and large in mold shirinkage and thermal expansion and so are not directly applicable to uses where they are subject to load under high temperature or required of strict dimensional stability. Therefore, the methods of incorporating glass fibers or any other reinforcements were proposed. But, such were shortcoming in that the molded products were inferior in surface appearance or had warpage and were not applicable to uses such as automobile exterior panel where the requirement for appearance or shape was strict.

On the other hand, polyphenylene ether is an excellent resin in heat resistance and dimensional stability. But, on account of its high softening point, it involved difficulties in melt processing, often decomposing during the melt processing. Therefore, it was usually used with styrenic resins blended. In these methods, however, there were some problems that the heat resistance was lowered and that the solvent resistance of polyphenylene ether, which was inherantly not so good, would be further deteriorated.

Thus, various attempts were made to resolve the problems concerned with aromatic polyester and polyphenylene ether all at once by blending both polymers. As such method, there were proposed a method of adding a polyester to the polyphenylene ether (Japanese Laid-Open Patent Publication (Kokai) No. 49-50050), a method of blending a polyphenylene ether of a polymerization degree of 10 or higher to the polybutylene terephthalate (Japanese Laid-Open Patent Publication (Kokai) No. 49-75662) and a method of blending a polyphenylene ether to the polyethylene terephthalate (Japanese Laid-Open Patent Publication (Kokai) No. 59-159847). However, these methods merely of a simple blend of aromatic polyester and polyphenylene ether. Therefore, while the polyphenylene ether would have the moldability and solvent resistance improved and the aromatic polyester have the deflection temperature under load and dimensional stability improved, the adhesion between both polymers was not so good, and so there were provided only resins being inferior in surface appearance of molded article and mechanical properties including the impact resistance, and the methods were not practically applicable. Furthermore, for improvement of the adhesion between aromatic polyester and polyphenylene ether, there were proposed a method of concurrently using a styrenic resin containing the epoxy radical as a third component in Japanese Laid-Open Patent Publication (Kokai) No. 60-221459 and a method of further using a phenoxy resin and an unsaturated carboxylic acid in Japanese Laid-Open Patent Publication (Kokai) No. 60-258249. However, according to these methods, the adhesion between aromatic polyester and polyphenylene ether would be improved but slightly, while the composition had the heat resistance degraded and, according to the former method, had the melt viscosity increased. Thus, there has been provided no resin composition exhibiting the good properties of aromatic polyester and polyphenylene ether synergetically.

DISCLOSURE OF THE INVENTION

The object of the present invention is to provide the resin composition being superior in surface appearance of molded article and mechanical properties, as well as in the moldability, heat resistance, dimensional stability and solvent resistance, and being useful for electrical and electronic equipment parts, automobile parts and mechanical parts, and process for preparation thereof.

The foregoing object of the invention was achieved by a resin composition comprising: For 100 parts by weight of a polyester composition comprised of (A) 5-95% by weight of an aromatic polyester having an inherent viscosity of 0.7-2.5 dl/g, and (B) 95-5% by weight of a polyphenylene ether having an inherent viscosity of 0.10-2.5 dl/g having a repeating unit of the formula

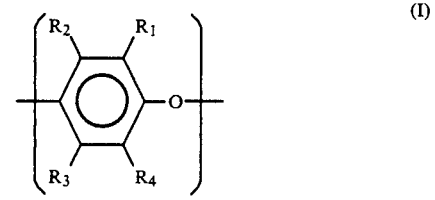 (I)

(where $R_1$ to $R_4$ represent respectively hydrogen, chlorine and bromine atoms, a hydrocarbon, substituted hydrocarbon, cyano, alkoxy and phenoxy radicals) and/or a modified polyphenylene ether obtained by reacting to a polyphenylene ether having said repeating unit of formula (I) 0.05-20% by weight of an active functional group containing monomer having in the molecule both of (a) an aliphatic unsaturated carbon-carbon double bond or triple bond and (b) one or two or more functional groups chosen from carboxyl, acid anhydride, amide, imide, ester, epoxy, amino, hydroxyl and isocyanate radicals, (C) 0.05-30 parts by weight of an epoxy compound represented by the formula

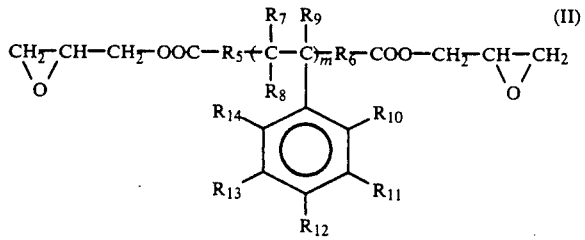 (II)

(where $R_5$ and $R_6$ represent respectively a substituted or unsubstituted hydrocarbon radical having 1-40 carbon atoms, $R_7$ to $R_9$ represent respectively hydrogen atom or a methyl radical, and $R_{10}$ to $R_{14}$ represent respectively hydrogen atom, a halogen atom, substituted or unsubstituted hydrocarbon, cyano, alkoxy and phenoxy radicals; m being an integer of 0-20, and n being 0 or 1).

The object of the present invention was more favorably achieved by a composition comprising further, in addition to said composition, 1-60 parts by weight of one or two or more impact modifier chosen from (a) to (c) below:

(a) Epoxy radical containing copolymers comprised of an α-olefin and an epoxy radical containing unsaturated monomer;

(b) Modified ethylene copolymers obtained by grafting 0.01-10 parts by weight of an unsaturated carboxylic acid or a derivative thereof to an unmodified ethylene copolymer comprised of ethylene and an α-olefin having 3-20 carbon atoms or an alkyl ester of unsaturated carboxylic acid; and (c) Block copolymers of a hydrogenated or unhydrogenated conjugated diene and an aromatic vinyl, or modified block copolymers obtained by grafting 0.01-10% by weight of an unsaturated carboxylic acid or a derivative thereof to said block copolymer.

THE BEST FORMS TO PRACTICE THE INVENTION

The present invention will be described in further details hereinafter.

The resin being used according to the present invention contains an aromatic polyester and an unmodified and/or modified polyphenylene ether.

The aromatic polyester being used according to the present invention is a polymer or copolymer having an aromatic ring in the chain and prepared by condensing mainly aromatic dicarboyxlic acid (or its ester forming derivative) and a diol (or its ester forming derivative).

For the aromatic dicarboxylic acid referred to here, there may be cited terephthalic acid, isophthalic acid, orthophthalic acid, 2,6-naphthalenedicarboxylic acid, 1,5-naphthalenedicarboxylic acid, bis(p-carboxyphenyl)methane, anthracenedicarboxylic acid, 4,4'-diphenyldicarboxylic acid, 4,4'-diphenyletherdicarboxylic acid, 2,2'-bis(p-carboxyphenoxy)ethane and so forth and ester forming derivatives thereof.

The said component may be substituted, for 40 molar percent or less, by a dicarboxylic acid other than the aromatic dicarboxylic acid such as aliphatic dicarboxylic acids including adipic acid, sebacic acid, azelaic acid, dodecanedioic acid, alicyclic dicarboxylic acids including 1,3-cyclohexane dicarboxylic acid, 1,4-cyclohexane dicarboxylic acid acid and their ester forming derivatives.

For the diol component, there may be cited aliphatic diols of 2-10 carbon atoms such as ethylene glycol, propylene glycol, 1,4-butanediol, neopenthyl glycol, 1,5-pentanediol, 1,6-hexanediol, decamethylene glycol and cyclohexanedimethanol, and if in a small amount, a long chain glycol of a molecular weight of 400-6000, that is, polyethylene glycol, poly-1,3-propylene glycol or polytetramethylene glycol may be copolymerized.

As examples of preferable aromatic polyesters used according to the present invention, polyethylene terephthalate, polypropylene terephthalate, polybutylene terephthalate, polyhexamethylene terephthalate, polycyclohexylenedimethylene terephthalate and polyethylene-2,6-naphthalate are listed. Most preferable thereamong are polybutylene terepthalate that has excellent mechanical strength.

The aromatic polyesters used according to the present invention should desirably have a inherent viscosity of 0.7-2.5 dl/g, preferably 0.8-2.0 dl/g or more preferably 1.0-1.5 dl/g. The inherent viscosity referred to here is obtainable by measuring a 0.5 g/100 ml solution of o-chlorophenol by an Ostwald viscometer at 25° C. and calculating by the formula $$\text{Inherent viscosity} = \frac{\ln \frac{t}{t_0}}{c} \quad \text{(III)}$$

(where c represents the concentration expressed in terms of grams of the polymer per 100 ml of the solution, $t_0$ the elution time of the solvent and t the elution time of the solution).

The polyphenylene ether used according to the present invention is chosen from those having the repeating unit shown by said formula (I) and/or modified polyphenylene ethers obtainable by reacting to a polyphenylene ether having said repeating unit of formula (I) 0.05-20% by weight of an active functional group containing monomer having both of (a) a aliphatic unsaturated carbon-carbon double bond or triple bond and (b) one or two or more functional groups chosen from radicals of carboxylic, acid anhydride, amide, imide, ester, epoxy, amino, hydroxyl and isocyanate.

As examples of $R_1$ to $R_4$ in said formula (I), hydrogen atom, chlorine atom, bromine atom and radicals such as methyl, ethyl, propyl, isopropyl, allyl, butyl, phenyl, benzyl, methylbenzyl, chloromethyl, cyanoethyl, cyano, methoxy, ethoxy and phenoxy are preferably listed. As examples of unmodified polymers, there may be listed poly-1,4-phenylene ether, poly-2,6-dimethyl-1,4-phenylene ether, poly-2,6-diethyl-1,4-phenylene ether, poly-2,6-dipropyl-1,4-phenylene ether, poly-2-methyl-6-allyl-1,4-phenylene ether, poly-2,6-dimethoxy-1,4-phenylene ether, poly-2,6-dichloromethyl-1,4-phenylene ether, poly-2,5-dimethyl-1,4-phenylene ether, poly-2,3,5,6-tetramethyl-1,4-phenylene ether, poly-2,6-dicyano-1,4-phenylene ether, poly-2,6-dicyano-1,4-phenylene ether, poly-2,6-dichloro-1,4-phenylene ether, poly-2,6-dibromo-1,4-phenylene ether, poly-2,3,6-trimethyl-1,4-phenylene ether, poly-2,6-diphenyl-1,4-phenylene ether and poly-2,6-ditolyl-1,4-phenylene ether. Thereamong, poly-2,6-dimethyl-1,4-phenylene ether and poly-2,6-dimethyl-1,4-phenylene ether copolymerized with 2,3,6-trimethylphenylene ether unit are especially preferable.

The polyphenylene ether used according to the present invention should have the inherent viscosity preferably within the range of 0.10-1.50 dl/g, more preferably 0.20-0.80 dl/g or most preferably 0.20-0.80 dl/g. When the inherent viscosity of polyphenylene ether is less than 0.10 dl/g, the resin composition has the mechanical property degraded, and when it is over 1.50 dl/g, the resin composition has also the mechanical property degraded on account of improper dispersion, and so the object of the invention is hardly achieved. The inherent viscosity referred to here is obtainable by measuring a 0.5 g/100 ml chloroform solution by an Ostwald viscometer at 25° C. and calculating according to said formula (III).

The polyphenylene ether can be produced by various methods. As an example, a method of oxidizing a phenol represented by the formula

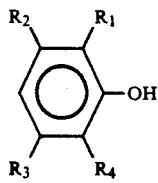

by introducing a gas containing oxygen in the presence of a catalyst containing a metal such as Fe, Mn, Co or Cu may be cited.

As preferable examples of the active functional group containing monomer used for modification of said unmodified polyphenylene ether, there may be cited maleic anhydride, himic anhydride, itaconic anhydride, glutaconic anhydride, citraconic anhydride, aconitic anhydride, 5-norbornene-2-methyl-2-carboxylic acid, fumaric acid, maleimide, maleic hydrazide, reaction products of maleic anhydride and amines having a structure expressed, for example, by

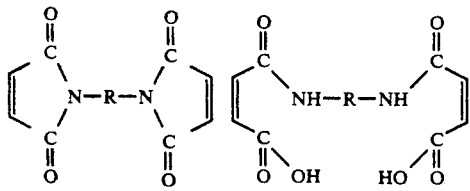

(where R represents an aliphatic or aromatic group), methyl-nadic anhydride, dichloromaleic anhydride, maleic amide, natural oils such as olive oil and sardine oil, epoxidized natural oils such as epoxidized soybean oil, unsaturated carboxylic acids such as acrylic acid, butenoic acid, crotonic acid, vinylacetic acid, methacrylic acid, pentenoic acid, angelic acid, α-ethylacrylic acid, β-methylcrotonic acid, 2-hexenoic acid, 2-methyl-2-pentenoic acid, 3-methyl-2-pentenoic acid, 2-heptenoic acid, 2-octenoic acid, 4-decenoic acid, 9-undecenoic acid, 4-dodecenoic acid, 5-dodecenoic acid, 9-tetradecenoic acid, 9-hexadecenoic acid, 2-octadecenoic acid, eicosenoic acid, docosenoic acid, erucic acid, tetracosenoic acid, 2,4-pentadienoic acid, 2,4-hexadienoic acid, 2,4-decadienoic acid, 2,4-dodecadienoic acid, 9,12-hexadecadienoic acid, 9,12-octadecadienoic acid, hexadecatrienoic acid, linoleic acid, linolenic acid, eicosaienoic acid, eicosatrienoic acid, ricinoleic acid, eleostearic acid, oleic acid, eicosapentaenoic acid, erucic acid, docosadienoic acid, docosatetrienoic acid, docosatetraenoic acid, docosapentaenoic acid, octacocenoic acid, dihydrophthalic acid and tetrahydrophthalic acid, or esters, acid amides, anhydrides, glycidyl esters and acylisocynates of these unsaturated carboxylic acids, or unsaturated alcohols such as allyl alcohol, crotyl alcohol, allylcarbinol, 4-pentene-i-ol, 10-undecene-1-ol, propargyl alcohol, 1,4-pentadiene-3-ol, 1,4-hexadiene-3-ol, alcohols expressed by formulas $C_nH_{2n-5}OH$, $C_nH_{2n-7}OH$ and $C_nH_{2n-9}OH$ (n being a positive integer), 3-butene-1-diol, 1,5-hexadiene-3,4-diol and 2,6-octadiene-4,5-diol, or unsaturated amines with the OH radical of these unsaturated alcohols substituted by —NH$_2$ radical, unsaturated glycidyl ethers with the OH radical substituted by

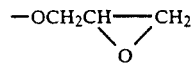

and unsaturated isocyanates with the OH radical substituted by isocyanate radical, or adducts of low polymers (for example, average molecular weight being 500 to about 10,000) or high polymers (for example, average molecular weight being 10,000 or higher) of butadiene and isoprene with maleic anhydride or phenols or those introduced amino, carboxyl, hydroxyl, epoxy or isocyanate radical, and the aromatic vinyl compounds such as α-methylstyrene and p-methylstyrene which have hydroxyl, epoxy or isocyanate radical introduced to the benzene ring or the substituted alkyl radical on the benzene ring. Thereamong, the compounds of the type containing one carbon-carbon double bond and one or two or more carboxyl, acid anhydride or epoxy radicals in the molecule are preferable, and further maleic anhydride, itaconic anhydride, methylnadic anhydride, tetrahydrophthalic anhydride, glycidyl methacrylate and diglycidyl tetrahydrophthalate are more preferably usable.

The definition of the active functional group containing monomers according to the present invention includes, of course, compounds including two or more of a functional group in the group (a) and two or more of a functional group (same or different type) in the group (b), and it is also possible to use two or more kinds of active functional group containing monomers.

The amount of the active functional group containing monomer to be used according to the present invention is in the range of 0.1–20 parts by weight for 100 parts by weight of polyphenylene ether, preferably 0.3–10 parts by weight or more preferably 0.5–5 parts by weight. An amount less than 0.1 part by weight is not preferable in that it tends to reduce the effect intended by the present invention, and an amount in excess of 20 parts by weight provides little difference in the effect and is, therefore, not economical.

For the preparation of the component (A), the following methods may be employed:

(1) A method of adding an active functional group containing monomer to a solution containing a polyphenylene ether, then stirring the mixture for several tens minutes or several hours at a temperature of 60°–150° C.; and (2) A method of melting the respective components in a system containing substantially no solvent for 20 seconds to 30 minutes or preferably 40 seconds to 5 minutes in a temperature range of 220°–370° C.

The method (1) is preferably employed in the case that the reaction and refining facilities have been installed but the method (2) is effective in that it allows modification with a light equipped facility such as a general purpose single or twin screw extruder being not in need of desolvation and polymer refining processes to permit short-time modification.

Preparation of the component (B) may be made in the copresence of a radical generator, and as such radical generator, common organic peroxides and diazo compounds may be cited. Preferable examples of them are benzoyl peroxide, dicumyl peroxide, di-tert-butyl peroxide, tertbutyl cumyl peroxide, tert-butyl hydroperoxide, cumene hydroperoxide, azobisisobutyronitrile, and the like.

The radical generator is economically used in an amount of 30 parts by weight or less or preferably 20 parts by weight or less for 100 parts by weight of the active functional group containing monomer.

Particularly, when a compound having carboxyl or acid anhydride radical is used, the effect of the invention is further exhibited by the use of this radical generator.

In the present invention, use of a modified polyphenylene ether provides a feature that the variation of the heat deflection temperature is reduced as compared with the case of using when an unmodified polymer.

The polyphenylene ether used according to the present invention may have another polymer blended and/or grafted in an amount of 50% by weight or less, preferably 30% by weight or less. As such polymer, polycarbonates, polysulfons, polyamides, polyolefins, vinylic polymers and rubber polymers are cited, and one or two or more of them may be used jointly. Thereamong, vinylic polymers and rubbery polymers are particularly preferable.

The blending ratio of the aromatic polyester (A) to unmodified and/or modified polyphenylene ether (B) in the composition of the present invention, that is, (A)/(B) is, by weight, 95/5-5/95, preferably 85/15-15/85 or more preferably 70/30-30/70. When the addition of polyphenylene ether is less than 5% by weight, there is provided only a resin of larger linear expansion and lower heat deflection temperature, and when it exceeds 95% by weight, the solvent resistance and moldability are impaired, and both cases are not desirable.

Subsequently, the epoxy compound or the component (C) of the composition according to the invention is a compound expressed by said formula (II). In the formula, $R_5$ and $R_6$ represent respectively a hydrocarbon radical having 1-40 carbon atoms, preferably 4-36 or more preferably 6-36 carbon atoms. $R_5$ and $R_6$ may be of either saturated or unsaturated and have ring structure. Concrete examples of $R_5$ and $R_6$ include methylene, ethylene, propylene, isopropylene, butylene, pentamethylene, hexamethylene, heptamethylene, octamethylene, nonamethylene, decamethylene, undecamethylene, dodecamethylene, hexadecamethylene, octadecamethylene, icosilene and triacontylene radicals and residual radicals removed of the carboxyl radical from dimeric acids (dimers of unsaturated carboxylic acids such as oleic acid and linoleic acid). $R_7$, $R_8$ and $R_9$ represent respectively hydrogen or methyl radical. Concrete examples of $R_{10}$ to $R_{14}$ include hydrogen, chlorine and bromine atoms and methyl, ethyl, propyl, isopropyl, allyl, butylphenyl, benzyl, methylbenzyl, chloromethyl, cyanoethyl, cyano, methoxy, ethoxy and phenoxy radicals.

Where there are present two or more substituted or unsubstituted phenylethylene units expressed by

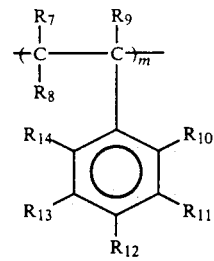

in the formula, the configuration of the substituted and unsubstituted phenyethylene units may be such that the α-carbon atoms, that is, those having the phenyl radical bonded are adjacent to each other, that the β-carbon atoms are adjacent to each other or that the α- and β-carbon atoms are adjacent to each other.

Concrete examples of the epoxy compound expressed by formula (II) preferably include diglycidyl 7,8-diphenyl-1,14-tetradecanedicarboxylate, diglycidyl 7-phenyl-1,14-tetradecanedicarboxylate, diglycidyl 5,6-diphenyl-1,10-decanedicarboxylate, diglycidyl 6,7-diphenyl-1,12-dodecanedicarboxylate, diglycidyl 6,8-diphenyl-1,14-tetradecanedicarboxylate, diglycidyl 7,8-diphenyl-7,8-dimetyl-1,14-tetradecanedicarboxylate, diglycidyl 7,8-bis(4-methylphenyl)-1,14-tetradecanedicarboxylate, diglycidyl 7,8-bis(chlorophenyl)-1,14-tetradecanedicarboxylate, diglycidyl 6,9-dimethyl-7,8-diphenyl-1,14-tetradecanedicarboxylate, diglycidyl decanedicarboxylate, diglycidyl dodecanedicarboxylate, diglycidyl hexadecanedicarboxylate, diglycidyl octadecanedicarboxylate, diglycidyl nonodecanedicarboxylate, diglycidyl eicosanedicarboxylate, diglycidyl triacontanedicarboxylate, diglycidyls of dimeric acids, diglycidyl 7-tetradecene-1,14-dicarboxylate, diglycidyl 7,11-octadecadiene-1,18-dicarboxylate, diglycidyl 10-ethynyl- 7-hexadecene-1,16-dicarboxylate and compounds of the formula

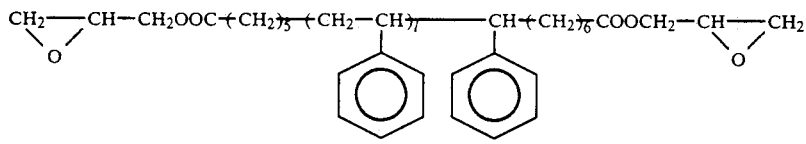

(l: an integer of 2-5)

Not only one but two or more of such compounds may be used jointly. Of the foregoing epoxy compounds, the compounds having 20-40 carbon atoms in that part which has the glycidyl ester radical excluded are particularly preferably.

The addition of the epoxy compound or component (C) according to the present invention is 0.05-30 parts by weight, preferably 0.2-20 parts by weight or more preferably 0.5-10 parts by weight for 100 parts by weight of the polyester composition comprised of the aromatic polyester and modified and/or unmodified polyphenylene ether. When the addition is less than 0.05 part by weight, improvement of the impact resistance is not satisfactory, or when it exceeds 30 parts by weight, the heat deflection temperature decreases or gelation occurs during the melt process, and so such addition is not desirable.

The epoxy compound specified as above according to the present invention is highly reactive with aromatic polyester and compatible with the polyphenylene ether to provide a good affinity between the aromatic polyester and the polyphenylene ether, and so it is considered that the resin composition of the present invention exhibit an excellent mechanical property as well as surface appearance of the molded article. When the polyphenylene ether is modified with an active functional group containing monomer, compatibility with the epoxy compound according to the invention is further improved, and so a molded article having more excellent mechanical property is obtainable. Improvement of the affinity between the aromatic polyester and the polyphenylene ether is not achieved by the usual bisphenol type epoxy compounds or other epoxy compounds such as glycidyl terephthalate.

Furthermore, according to the present invention, one or two or more kinds of impact modifier chosen from (a) to (c) may be added for improvement of the impact strength.

(a) Epoxy radical containing copolymers comprised of an α-olefin and an epoxy radical containing unsaturated monomer.

(b) Modified ethylene copolymers obtained by graft reaction of 0.01–10% by weight of an unsaturated carboxylic acid or a derivative thereof to an unmodified ethylene copolymer comprised of ethylene and an α-olefin having 3–20 carbon atoms or an alkyl ester of an unsaturated carboxylic acid.

(c) Block copolymers of a hydrogenated or unhydrogenated conjugated diene and an aromatic vinyl or modified block copolymers obtained by grafting 0.01% by weight of an unsaturated carboxylic acid or a derivative thereof to said block copolymer.

The epoxy radical containing copolymer can be produced by using an α-olefin and an epoxy radical containing unsaturated monomer according to a common method such as high pressure radical polymerization, solution polymerization or emulsion polymerization.

The α-olefin has 2–20, preferably 2–8, carbon atoms. Thereamong concrete examples include ethylene, propylene and butene-1, and ethylene is preferably used.

Furthermore, the epoxy radical containing unsaturated monomers includes glycidyl ethers such as allylglycidyl ether and 2-methylglycidyl ether and glycidyl esters of the formula

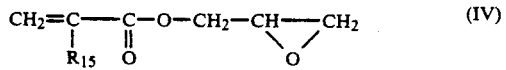

(where $R_{15}$ represents a hydrogen atom, a lower alkyl radical or a lower alkyl radical substituted by glycidyl ester).

Concrete examples of the glycidyl ester include glycidyl acrylate, glycidyl methacrylate, glycidyl ethacrylate and glycidyl itaconate. As a preferable epoxy radical containing unsaturated monomer, glycidyl methacrylate and glycidyl acrylate are cited.

The copolymerizing amount of the epoxy radical containing unsaturated monomer in the epoxy radical containing polymer is adequately within the range of 0.1–30% by weight, preferably 1–20% by weight. Furthermore, if 40% by weight or less, one or more of the copolymerizable unsaturated monomers with said copolymer, that is, vinyl ethers, vinyl esters such as vinyl acetate and vinyl propionate, methyl, ethyl, propyl and butyl esters of acrylic and methacrylic acids, acrylonitrile, styrene and carbon monoxide may be copolymerized.

Preferable examples of the epoxy radical containing copolymer according to the present invention include ethylene/glycidyl methacrylate copolymer, ethylene/vinyl acetate/glycidyl methacrylate copolymer, ethylene/ethyl acrylate/glycidyl methacrylate copolymer, ethylene/methyl methacrylate/glycidyl methacrylate copolymer, ethylene/glycidyl acrylate copolymer, ethylene/vinyl acetate/glycidyl acrylate copolymer and ethylene/glycidyl ether copolymer. Thereamong, ethylene/glycidyl methacrylate copolymer is most preferable.

If there are used, together with the epoxy radical containing copolymer used according to the present invention, an ethylene copolymer comprised of ethylene and an α-olefin having 3–20 carbon atoms and/or a diene copolymer comprised of ethylene, an α-olefin having 3–20 carbon atoms and a unconjugated diene, the impact resistance is further improved. Concrete examples of such copolymer include ethylene/propylene copolymer, ethylene/butene-1 copolymer, ethylene/pentene-1 copolymer, ethylene/propylene/butene-1 copolymer, ethylene/propylene/5-ethylidene-2-norbornane copolymer, ethylene/propylene/1,4-hexadiene copolymer and ethylene/propylene/dicyclopentadiene copolymer, and thereamong, ethylene/propylene copolymer and ethylene/butene-1 copolymer are preferable.

Subsequently, said modified ethylene copolymer (b) is obtained by graft reaction of 0.01–10% by weight of an unsaturated carboxylic acid or a derivative thereof to an ethylene copolymer comprised of ethylene and an α-olefin having 3–20 carbon atoms or an alkyl ester of an unsaturated carboxylic acid.

The α-olefin having 3–20 carbon atoms in the unmodified ethylene copolymer is preferably propylene, butene-1, pentene-1, 3-methylpentene-1 or octene-1, and propylene and butene-1 are more preferable, and two or more of them are jointly usable. The alkyl esters of the unsaturated carboxylic acid include an ester with a fatty alcohol of 1–20 carbon atoms, and concrete examples preferably include methyl acrylate, ethyl acrylate, propyl acrylate, butyl acrylate pentyl acrylate, hexyl acrylate, octyl acrylate, decyl acrylate, dodecyl acrylate, methyl methacrylate, ethyl methacrylate, propyl methacrylate, butyl methacrylate, hexyl methacrylate, and octyl methacrylate, and ethyl acrylate and methyl methacrylate are particularly preferable, and two or more of them may be used jointly.

Such copolymer comprised of unmodified ethylene and α-olefin having 3–20 carbon atoms may be copolymerized with unconjugated diene further.

Examples of such unconjugated diene include 5-methylidene-2-norbornane, 5-ethylidene-2-norbornane, dicyclopentadiene and 1,4-hexadiene preferably.

The copolymerized ratio of ethylene to α-olefin having 3–20 carbon atoms is, when the unconjugated diene is not included, 40/60-99/1 (molar ratio), preferably 70/30-95/5 (molar ratio), and when the unconjugated diene is included, copolymerized amount of the α-olefin having 3–20 carbon atoms is 5–80 molar percent, preferably 20–60 molar percent, and that of the unconjugated diene is 0.1–20 molar percent, preferably 0.5–10 molar percent.

Further, copolymerized amount of ethylene to alkyl ester of unsaturated carboxylic acid is 40/60-99/1 (by weight), preferably 50/50-90/10 (by weight), or more preferably 55/45-80/20 (by weight).

Concrete examples of the unmodified ethylene copolymer preferably include ethylene/propylene copolymer, ethylene/butene-1 copolymer, ethylene/propylene/dicyclopentadiene copolymer, ethylene/propylene/5-ethylidene-2-norbornane copolymer, ethylene/propylene/1,4-hexadiene copolymer, ethylene/ethyl acrylate copolymer and ethylene/ethyl methacrylate copolymer, and thereamong, ethylene/propylene copolymer, ethylene/butene-1 copolymer and ethylene/ethyl acrylate copolymer, which contain no non-conjugate diene, are more preferably usable.

As the unsaturated carboxylic acid providing a modified ethylene copolymer through graft reaction to said unmodified ethylene copolymer, acrylic acid, methacrylic acid, ethacrylic acid, crotonic acid, maleic acid, fumaric acid, itaconic acid, citraconic acid and butenedicarboxylic acid are preferably listed. Furthermore, their derivatives preferably include alkyl ester, glycidyl esters, acid anhydrides or imides are listed, and of these, glycidyl esters, acid anhydrides and imides.

Concrete examples of the unsaturated carboxylic acid or derivative thereof include maleic acid, fumaric acid glycidyl acrylate, glycidyl methacrylate, glycidyl ethacrylate, diglycidyl itaconate, diglycidyl citraconate, diglycidyl butendicarboxylate, diglycidyl tetrahydrophthalate, maleic anhydride, itaconic anhydride, citraconic anhydride, tetrahydrophthalic anhydride, maleimide, itaconimide and citraconimide, and particularly, glycidyl methacrylate, maleic anhydride itaconic anhydride and maleimide are preferably usable. Two or more of these unsaturated monomers may be used jointly.

The grafting amount of the unsaturated monomer is 0.01–10% by weight, preferably 0.05–5% by weight. Greater or smaller amount is not preferable in that when smaller than 0.01% by weight, improvement of the impact resistance is not satisfactory, or when greater than 10% by weight, the heat resistance of the aromatic polyester is impaired. The graft reaction referred to here means chemical bond formation between the unsaturated carboxylic acid or its derivative and the unmodifed ethylene copolymer.

The modified ethylene copolymer can be readily prepared by any of the conventional methods such as, for example, by adding an unsaturated carboxylic acid or its derivative to an unmodified ethylene copolymer and melt compounding the mixture at 150°–300° C. As an equipment used for melt compounding, a screw extruder or Banbury mixer is applicable. Further, if an organic peroxide is used in an amount of 0.001–0.1% by weight for the unmodified ethylene copolymer on melt compounding, it is possible to achieve the graft reaction more efficiently. Such organic peroxide preferably has a molecular weight of 200 or higher. Concrete examples include tert-butylcumyl peroxide, di-tert-butyl peroxide, dicumyl peroxide, 2,5-dimethyl-2,5di(tert-butylperoxy)hexane, 2,5-dimethyl-2,5-di(tert-butylperoxy)-hexyne-3 and $\alpha,\alpha'$-di(tert-butylperoxy)diisopropylbenzene.

Said block copolymer (c) is a block copolymer of a hydrogenated or unhydrogenated conjugated diene and an aromatic vinyl, and the modified block copolymer is obtained by grafting 0.01–10% by weight of an unsaturated carboxylic acid or a derivative thereof to said unmodified block copolymer.

The conjugated diene used as a raw material preparing the unhydrogenated block copolymer include 1,3-butadiene, isoprene, 1,3-pentadiene or the like, and 1,3-butadiene and isoprene are preferably usable, and for the aromatic vinyl hydrocarbon includes styrene, $\alpha$-methylstyrene, o-methylstyrene, p-methylstyrene, 1,3-dimethylstyrene and vinyl naphthalene, and styrene is preferably usable.

The hydrogenated block copolymer of conjugate diene and aromatic vinyl hydrocarbon is the polymer in which at least 80% 1% of the unsaturated bond of said unhydrogenated block copolymer is reduced by hydrogenation, preferably with the proportion of reduction by hydrogenation of the double bond of the aromatic nucleus being 10% or less.

Preferably examples of said hydrogenated and unhydrogenated block copolymers include hydrogenated or unhydrogenated styrene/butadiene/styrene triblock copolymer and hydrogenated or unhydrogenated styrene/isoprene/styrene triblock copolymer, and from the viewpoint of heat resistance, styrene/butadiene/styrene triblock copolymer is more preferably usable.

As the unsaturated carboxylic acid or its derivative providing the modified block copolymer through graft reaction with said hydrogenated or unhydrogenated block copolymer of conjugated diene and aromatic vinyl, the compounds listed in the paragraph of (b) for the modified ethylene copolymer are similarly usable.

The modified block copolymer can be readily produced by, for example, adding an unsaturated carboxylic acid or its derivative to an unmodified hydrogenated or unhydrogenated block copolymer, then melt-compounding the mixture at 150°–300° C. As an equipment for melt compounding, a screw extruder or Banbury mixer is usable.

This graft reaction is considered to proceed according to the so-called "en" type reaction between the unsaturated bond in the hydrogenated or unhydrogenated block copolymer and the unsaturated carboxylic acid or its derivative. Accordingly, when a hydrogenated block copolymer obtained at a high rate of hydrogenation is used, it is possible to make the graft reaction take place efficiently by using an organic peroxide in an amount of 0.001–0.1% for the hydrogenated block copolymer on melt-compounding. Such organic peroxides include similar compounds to those noted in paragraph (b) for the modified ethylene copolymers.

The impact modifier (a) to (c) used according to the present invention should have a melt flow rate (referred to as MFR in the following) preferably within the range of 0.05–200, more preferably within the range of 0.1–100, furthermore preferably within the range of 0.5–50. Smaller or greater MFR tends to reduced the effect of improvement of the impact resistance. Here, MFR is the value obtained according to ASTM D1238 (measured at 190° C.), and the unit is g/10 min.

The impact modifiers (a) to (c) according to the present invention characteristically give a great effect to improve the impact resistance. Also, they have another characteristics, that is variation of the heat deflection temperature is reduced, the appearance of the molded article is not impaired and the lowering of the heat deflection temperature is minimized.

The addition amount of the impact modifiers (a) to (c) according to the present invention is, in the amount of a single modifier used or total amount of two or more modifier used, adequately 1–60 parts by weight for 100 parts by weight of the sum of aromatic polyester and unmodified and/or modified polyphenylene ether, preferably 2-40 parts by weight or more preferably 3-30 parts by weight.

When an epoxy radical containing copolymer or an ethylene copolymer modified with an epoxy radical containing unsaturated monomer and a hydrogenated or unhydrogenated block copolymer are used as the impact modifier, if a compound accelerating the reaction between the epoxy compound and the carboxylic acid is added, there results an effect to improve the impact resistance further. Such compounds include tertiary amines such as triphenylamine and 2,4,6-tris(-dimethylaminomethyl)phenol, phosphite such as triisodecyl phosphite, phosphonium compounds such as triphenylallylphosphonium bromide, tertiary phosphines such as triphenylphosphine, metal salts of carboxylic acids such as lithium stearate, metal salts of sulfonic acids such as sodium 3,5-dicarbomethoxy benzene sulfonate and ester salts of sulfuric acids such as sodium lauryl sulfate, and the compound is preferably added in an amount of 0.001-5% by weight per resin composition.

If desired, the composition of the present invention may be subjected to addition of one or more kinds of conventional additives such as fibrous and granular fillers and reinforcements (such as, for example, glass fibers, carbon fibers, asbestos, plaster fibers, wollastonites, micas, clays, talcs, aluminas, titanium oxides, calcium carbonates, barium sulfates, glass beads and glass flakes), antioxidants and heat stabilizers (such as, for example, hindered phenols, hydroquinones, thioethers, phosphites, including their derivatives and the combinations thereof), ultraviolet absorbents (such as, for example, resorcinols, salicylates, benzotriazoles and benzophenones), lubricants and mold release agents (such as, for example, stearic acid and its salts, montanic acid and its salts, half-esters and esters), colorants including dyes and pigments (such as, for example, cadmium sulfide, phthalocyanine and carbon black), flame retardants (such as, for example, halogen substituted aromatic compounds including decabromodiphenyl ether and brominated polycarbonates, melamine compounds, cyanuric acid derivatives and phosphorus compounds), flame retarding auxiliaries (such as, for example, antimony oxide), antistatic agents (such as, for example, sodium dodecylbenzenesulfonate and polyalkylene glycol), plasticizers (such as, for example, triphenyl phosphate and other phosphates, phthalates and benzoates), and nucleating agents and the like, insofar as the characteristics of the resulting compositions are not caused to deteriorate. Further, if desired, the composition of the present invention can be subjected the addition of one or more of the other kinds of thermoplastic resins (such as, for example, polyethylenes, polypropylenes, polystyrenes, ABS resins, acrylic resins, fluorocarbon polymers, polyamides, polyacetals, polycarbonates, polysulfones and polyesters elastomers).

There is no limitation in the preparative method of the resin composition of the present invention, but preferably a method of melt compounding the aromatic polyester, unmodified and/or modified polyphenylene ether, epoxy compound and impact strength improving agent and other additives, as required, at 250°-320° C., or more preferably at 260°-310° C. is cited. In the case of the melt compounding carried out at such temperature range, good dispersion of the components is achieved, so that a resin composition excellent in mechanical property can be obtained.

As apparatus for melt compounding, mixing rools, Banbury mixer, kneader and extruder are listed, and of these, the extruder is preferably usable. As an extruder, either of a single screw or having two or more screw are usable, but among them use of a twin screw extruder is preferable.

For the purpose of obtaining a molded article from the resin composition of the present invention, a conventional method including injection molding, extrusion molding or blow molding is applicable, and the obtained molded article exhibits good properties.

The present invention is illustrated below in detail with reference to Examples, but these Examples are by way of illustration and not by way of limitation.

In the illustrative Examples and Comparative Examples, parts represent parts by weight, and the following symbols show the compounds given for the respective symbols.

A-1: Polybutylene terephthalate having an inherent viscosity of 1.25 dl/g.
A-2: Polyethylene terephthalate having an inherent viscosity of 1.11 dl/g.
B-1: Poly-2,6-dimethyl-1,4-phenylene ether having an inherent viscosity of 0.46 dl/g.
B-2: Modified polyphenylene ether prepared by 2.0% by weight of maleic anhydride grafting to B-1.
B-3: Modified polyphenylene ether prepared by 2.1% by weight of diglycidyl tetrahydrophthalate grafting to B-1.
B-4: Modified polyphenylene ether prepared by 2.2% by weight of acrylamide grafting to B-1.
B-5: Modified polyphenylene ether prepared by 2.5% by weight of maleimide grafting to B-1.
B-6: Poly-2,6-dimethyl-1,4-phenylene ether having an intrinsic viscosity of 1.61 dl/g.
B-7: Modified polyphenylene ether prepared by 2.1% by weight of maleic anhydride grafting to B-6.

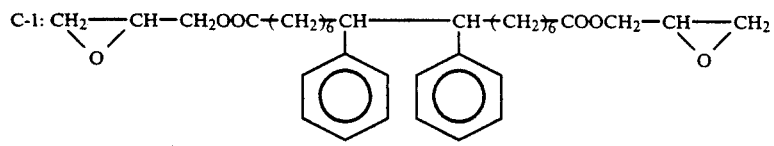

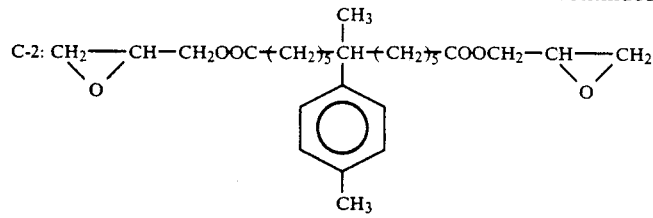

C-2:

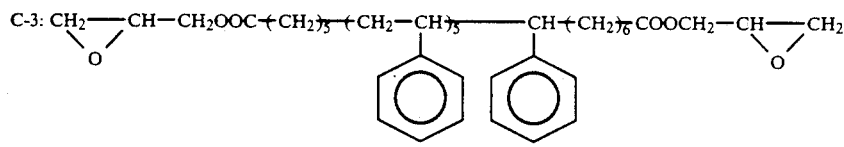

C-3:

C-4: Diglycidyl dimerate
C-5: Diglycidyl tetradecanedicarboxylate

EXAMPLES 1 to 10

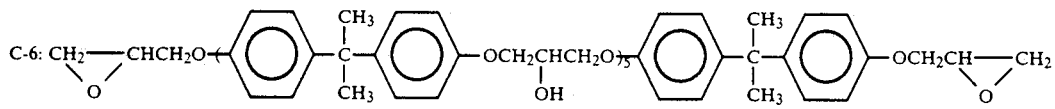

C-6:

C-7: Styrene/glycidyl methacrylate (90/10 molar ratio) copolymer (number average molecular weight, 4800).

D-1: Ethylene/glycidyl methacrylate (90/10 weight ratio) copolymer; MFR=7.

D-2: Modified ethylene copolymer prepared by 2.5% by weight of maleic anhydride grafting to ethylene/-butene-1 (90/10 molar ratio) copolymer; MFR=3.5.

D-3: Modified ethylene copolymer prepared by 2.3% by weight of glycidyl methacrylate grafting to ethylene/propylene (80/20 molar ratio) copolymer; MFR=3.0.

D-4: Modified olefin copolymer prepared by 2.0% by weight of maleic anhydride grafting to hydrogenated styrene/butadiene/styrene triblock copolymer (styrene content, 25% by weight; residual degree of unsaturation of the butadiene part, 2%); MFR=2.7.

D-5: Styrene/butadiene/styrene triblock copolymer (styrene content, 30% by weight); MFR=5.5.

D-6: Modified ethylene copolymer prepared by 1.8% by weight of maleic anhydride grafting to ethylene/ethyl acrylate (70/30 weight ratio) copolymer; MFR=2.5.

D-7: Unmodified ethylene/propylene (80/20 molar ratio) copolymer; MFR=3.6.

D-8: Modified ethylene copolymer prepared by 2.5% by weight of maleic anhydride grafting to ethylene/-vinyl acetate (70/30 weight ratio) copolymer; MFR=3.2.

Each of the compositions of dry blend of aromatic polyester, polyphenylene ether and epoxy compound shown in Table 1 was melt compounded in use of a 30 mm$\phi$ twin screw extruder set at 285° C. Furthermore, the pellets obtained were injection molded into square plates of 3 mm×80 mm×80 mm, a $\frac{1}{4}$"-wide test specimens for measurement of the heat deflection temperature and a $\frac{1}{8}$"-wide Izod impact test specimens with mold notches using a screw inline type injection molding machine set at 270° C. These test specimens had the surface appearance evaluated by visual observation. Then, using the test specimen for measurement of the heat deflection temperature, the heat deflection temperature (under 4.6 kg/cm$^2$ load) was determined according to ASTM D648, and using the $\frac{1}{8}$" wide mold notched test specimen, the Izod impact strength was measured. The heat deflection temperature was measured five times, and the mean value and the difference between the maximum and minimum values were obtained. Also, by measuring the melt viscosity of the pellets at 280° C. and minimum injection pressure which is the minimum pressure required for filling the resin into the mold (guage pressure; smaller value indicating better flow) at the time of molding the test specimens, the molding flowability was evaluated. The puncture impact strenght was measured as an absorption energy while the 3 mm×80 mm×80 mm square plate had completely broken with a Rheometrics' RIT-8000 high speed impact tester used at an impact speed of 5 m/sec under 23° C. environment.

TABLE 1

| Cases | | Compositions | | | | | | Izod impact strength (kg · cm/ cm · notch) | Puncture Impact strength (kg · cm) | Heat Deflection Temperature (°C.) | | Melt Viscosity (poise × 10$^3$) | Minimum Injection Pressure (kg/cm$^3$) | Appearance of Molded Article*[1] |
|---|---|---|---|---|---|---|---|---|---|---|---|---|---|---|
| | | Aromatic Polyester | | Polyphenylene Ether | | Epoxy Compound | | | | Mean Value | Max. Value - Min. Value | | | |
| | | Kinds | Amounts (Parts) | Kinds | Amounts (Parts) | Kinds | Amounts (Parts) | | | | | | | |
| Examples | 1 | A-1 | 75 | B-1 | 25 | C-1 | 5 | 9.8 | 320 | 167 | 14 | 5.4 | 40 | o |
| | 2 | A-1 | 50 | B-1 | 50 | C-1 | 5 | 9.1 | 300 | 182 | 18 | 8.3 | 46 | o |

TABLE 1-continued

| Cases | | Compositions Aromatic Polyester Kinds | Amounts (Parts) | Polyphenylene Ether Kinds | Amounts (Parts) | Epoxy Compound Kinds | Amounts (Parts) | Izod impact strength (kg·cm/cm·notch) | Puncture Impact strength (kg·cm) | Heat Deflection Temperature (°C.) Mean Value | Max. Value - Min. Value | Melt Viscosity (poise × 10³) | Minimum Injection Pressure (kg/cm³) | Appearance of Molded Article*1 |
|---|---|---|---|---|---|---|---|---|---|---|---|---|---|---|
| | 3 | A-1 | 25 | B-1 | 75 | C-1 | 5 | 8.5 | 280 | 189 | 18 | 9.7 | 60 | o |
| | 4 | A-1 | 50 | B-1 | 50 | C-1 | 10 | 10.5 | 330 | 176 | 17 | 7.2 | 48 | o |
| | 5 | A-1 | 50 | B-1 | 50 | C-2 | 5 | 9.0 | 290 | 182 | 18 | 8.5 | 47 | o |
| | 6 | A-1 | 50 | B-1 | 50 | C-3 | 10 | 8.3 | 270 | 174 | 18 | 7.1 | 45 | o |
| | 7 | A-1 | 50 | B-1 | 50 | C-4 | 2 | 9.2 | 300 | 183 | 16 | 8.2 | 45 | o |
| | 8 | A-1 | 50 | B-1 | 50 | C-5 | 5 | 8.2 | 270 | 173 | 18 | 8.4 | 47 | o |
| | 9 | A-2 | 50 | B-1 | 50 | C-1 | 1 | 8.4 | 270 | 180 | 18 | 9.0 | 56 | o |
| | 10 | A-2 | 50 | B-1 | 50 | C-4 | 1 | 8.7 | 280 | 181 | 18 | 8.9 | 56 | o |
| Reference | 1 | A-1 | 97 | B-1 | 3 | C-1 | 5 | 3.7 | 160 | 152 | 15 | 4.1 | 30 | o |
| | 2 | A-1 | 3 | B-1 | 97 | C-1 | 5 | 4.2 | 140 | 195 | 14 | >50 | >95 | x |
| | 3 | A-1 | 50 | B-1 | 50 | C-1 | 0.03 | 3.6 | 160 | 173 | 23 | 12.3 | 65 | Δ |
| | 4 | A-1 | 50 | B-1 | 50 | C-4 | 0.03 | 3.8 | 170 | 174 | 22 | 12.8 | 67 | Δ |
| | 5 | A-1 | 50 | B-1 | 50 | C-1 | 35 | 3.3 | 160 | 135 | 10 | >50 Gelled | >95 | Δ |
| | 6 | A-1 | 50 | B-6 | 50 | C-1 | 5 | 2.8 | 110 | 159 | 22 | 45.5 | >95 | x |
| | 7 | A-1 | 50 | B-1 | 50 | C-6 | 5 | 2.4 | 90 | 163 | 23 | 12.4 | 67 | x |
| | 8 | A-1 | 50 | B-1 | 50 | C-7 | 10 | 3.8 | 160 | 160 | 22 | 19.8 | 80 | Δ |
| | 9 | A-2 | 50 | B-1 | 50 | C-1 | 0.03 | 3.3 | 130 | 170 | 23 | 13.5 | 68 | Δ |

Note:
*1 Appearance of molded article o: Luster, good
Δ: Luster, not good (flow marks)
x: Luster, bad (greater surface roughness)

As seen from the results shown in Table 1, the resin compositions in the present invention having a specific epoxy compound used together with the aromatic polyester and polyphenylene ether are high in the deflection temperature and good in the balance of impact resistance and moldability (molding flowability and appearance of molded article). As seen from comparison with References 7 and 8, such effects are not attainable by use of any other epoxy compound other than that of the present invention.

EXAMPLES 11 to 19

Each of the compositions of dry blend of aromatic polyester, modified polyphenylene ether and epoxy compound shown in Table 2 was melt compounded and injection molded and had the characteristics evaluated according to the procedure of Example 1. The results are shown in Table 2.

TABLE 2

| Cases | | Compositions Aromatic Polyester Kinds | Amounts (Parts) | Polyphenylene Ether Kinds | Amounts (Parts) | Epoxy Compound Kinds | Amounts (Parts) | Izod impact strength (kg·cm/cm·notch) | Puncture Impact strength (kg·cm) | Heat Deflection Temperature (°C.) Mean Value | Max. Value - Min. Value | Melt Viscosity (poise × 10³) | Minimum Injection Pressure (kg/cm³) | Appearance of Molded Article*1 |
|---|---|---|---|---|---|---|---|---|---|---|---|---|---|---|
| Examples | 11 | A-1 | 75 | B-2 | 25 | C-4 | 2 | 10.5 | 350 | 168 | 5 | 5.2 | 38 | o |
| | 12 | A-1 | 50 | B-2 | 50 | C-4 | 2 | 9.9 | 320 | 183 | 6 | 8.1 | 44 | o |
| | 13 | A-1 | 25 | B-2 | 75 | C-4 | 2 | 9.2 | 300 | 188 | 6 | 9.5 | 58 | o |
| | 14 | A-1 | 50 | B-2 | 50 | C-1 | 5 | 9.5 | 310 | 182 | 7 | 8.2 | 45 | o |
| | 15 | A-1 | 50 | B-3 | 50 | C-4 | 2 | 9.8 | 320 | 182 | 7 | 8.3 | 46 | o |
| | 16 | A-1 | 50 | B-4 | 50 | C-4 | 2 | 9.4 | 310 | 182 | 8 | 8.3 | 46 | o |
| | 17 | A-1 | 50 | B-5 | 50 | C-4 | 2 | 9.2 | 300 | 182 | 8 | 8.2 | 45 | o |
| | 18 | A-2 | 50 | B-2 | 50 | C-1 | 1 | 8.6 | 280 | 180 | 8 | 8.9 | 50 | o |
| | 19 | A-2 | 50 | B-2 | 50 | C-4 | 1 | 8.9 | 300 | 180 | 7 | 8.8 | 50 | o |
| Reference | 10 | A-1 | 50 | B-2 | 50 | C-4 | 0.03 | 3.9 | 170 | 174 | 22 | 12.5 | 66 | Δ |
| | 11 | A-1 | 50 | B-2 | 50 | C-6 | 5 | 2.6 | 100 | 163 | 19 | 12.3 | 65 | x |
| | 12 | A-1 | 50 | B-2 | 50 | C-7 | 10 | 3.9 | 170 | 158 | 18 | 19.6 | 79 | x |
| | 13 | A-1 | 50 | B-7 | 50 | C-4 | 2 | 2.9 | 110 | 156 | 18 | 44.3 | >95 | x |
| | 14 | A-2 | 50 | B-2 | 50 | C-4 | 0.03 | 3.5 | 130 | 171 | 22 | 13.5 | 66 | Δ |

Note:
*1 Appearance of molded article o: Luster, good
Δ: Luster, not good (flow marks)
x: Luster, bad (greater surface roughness)

As seen from the results shown in Table 2, the compositions having a particular epoxy compound used together with the aromatic polyester and modified polyphenylene ether feature in that the impact resistance and moldability (molding flowability and appearance of molded article) are well balanced and that the heat deflection temperature is high with little dispersion so that the physical properties are steadied.

EXAMPLES 20 to 30

To examples 7 to 12, impact modifiers D-1 to D-8 were dry blended respectively in an amount noted in Table 3, then melt compounding, injection molding and evaluation of the characteristics were made according to the procedure of Example 7 or 12. The results are shown in Table 3.

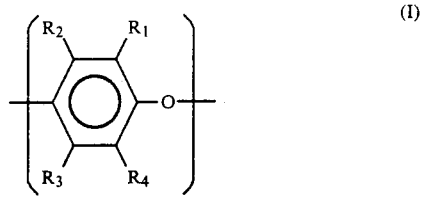

where $R_1$ to $R_4$ each independently represent hydrogen, chlorine and bromine atoms, a hydrocarbon, substituted hydrocarbon, cyano, alkoxy and

TABLE 3

| Cases | | Polyphenylene Ether Kinds | Impact Modifier Kinds | Impact Modifier Amounts (Parts) | Izod impact strength (kg·cm/cm·notch) | Puncture Impact strength (kg·cm) | Deflection Temperature (°C.) Mean Value | Deflection Temperature (°C.) Max. Value - Min. Value | Melt Viscosity (poise × $10^3$) | Minimum Injection Pressure (kg/cm$^3$) | Appearance[1] of Molded Article |
|---|---|---|---|---|---|---|---|---|---|---|---|
| Example | 20 | B-1 | D-1 | 5 | 17 | 400 | 180 | 9 | 8.0 | 44 | o |
| | 21 | B-1 | D-1 | 15 | 36 | 490 | 175 | 7 | 7.9 | 43 | o |
| | 22 | B-1 | D-1 | 30 | 55 | 560 | 169 | 6 | 7.7 | 42 | o |
| | 23 | B-1 | D-5 | 15 | 28 | 440 | 178 | 7 | 7.9 | 43 | o |
| | 24 | B-2 | D-2 | 15 | 40 | 520 | 177 | 3 | 7.8 | 42 | o |
| | 25 | B-2 | D-3 | 15 | 45 | 550 | 177 | 3 | 7.8 | 42 | o |
| | 26 | B-2 | D-4 | 15 | 43 | 540 | 178 | 3 | 7.8 | 42 | o |
| | 27 | B-2 | D-6 | 15 | 49 | 570 | 178 | 2 | 7.7 | 42 | o |
| | 28 | B-1 | D-7 | 15 | 12 | 350 | 168 | 9 | 7.6 | 41 | Δ |
| | 29 | B-2 | D-7 | 15 | 13 | 360 | 168 | 8 | 7.6 | 41 | Δ |
| | 30 | B-2 | D-8 | 15 | 15 | 380 | 169 | 7 | 7.6 | 41 | Δ |

Note:
[1] Appearance of molded article o: Luster, good
Δ: Luster, not good (flow marks)
x: Luster, bad (greater surface roughness)

The results in Table 3 demonstrate that in comparison with the Comparative Examples, when a particular impact modifier is further added to the composition of the present invention, the impact resistance can be greatly improved without scarcely degrading the deflection temperature. Also, the dispersion of the heat deflection temperature becomes little, and the molding flowability can be improved further.

INDUSTRIAL APPLICABILITY OF THE INVENTION

The resin compositions according to the present invention are useful for manufacturing electrical and electronic equipment parts, automobile parts and mechanical parts.

What is claimed is:

1. A resin composition comprising:
100 parts by weight of polyester composition comprised of (A) and (B) as follows
(A) 5-95% by weight of an aromatic polyester having an inherent viscosity of 0.7-2.5 dl/g by measurement of a 0.5 g/100 ml solution of o-chlorophenol by an Ostwald viscometer at 25° C.,
(B) 95-5% by weight of a modified polyphenylene ether obtained by reacting to a polyphenylene ether having an inherent viscosity of 0.10-1.5 dl/g by measurement of a 0.5 g/ml chloroform solution by an Ostwald viscometer of 25° C. and a repeating unit of a formula phenoxy radicals, 0.5-20% by weight of an active functional-group containing monomer having in the molecule both of (a) a carbon-carbon unsaturated double bond and (b) at least one functional group selected from the group consisting of carboxyl, acid anhydride and epoxy radicals reacted with the polyphenylene ether, and (C) 0.05-30 parts by weight of an epoxy compound represented by the formula

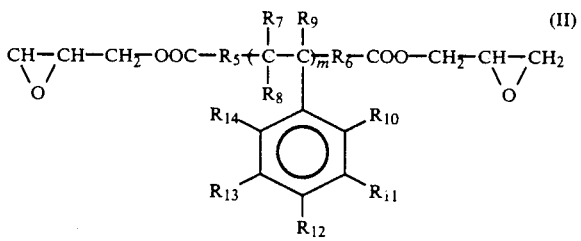

(where $R_5$ and $R_6$ each independently represent a substituted or unsubstituted hydrocarbon radical having 1-40 carbon atoms, $R_7$ to $R_9$ each independently represent a hydrogen atom, or a methyl radical, and $R_{10}$ to $R_{14}$ each independently represent a hydrogen atom, a halogen atom, substituted or unsubstituted hydrocarbon, cyano, alkoxy, phenoxy and nitro radicals; and m being an integer of 0-20.

2. A composition as set forth in claim 1 wherein the aromatic polyester is a polyalkylene terephthalate.

3. A composition as set forth in claim 2 wherein the polyalkylene terephthalate is a polybutylene terephthalate.

4. A composition as set forth in claim 1 wherein the polyphenylene ether is a poly-2,6-dimethyl-1,4-phenylene ether of a poly-2,6-dimethyl-1,4-phenylene ether copolymerized with 2,3,6-trimethylphenylene ether unit.

5. A resin composition comprising:

100 parts by weight of polyester composition comprised of (A) and (B) as follows (A) 5-95% by weight of an aromatic polyester having an inherent viscosity of 0.7-2.5 dl/g, by measurement of a 0.5 g/100 ml solution of 0-chlorophenol by an Ostwald viscometer at 25° C.

(B) 95-5% by weight of a modified polyphenylene ether obtained by reacting to a polyphenylene ether having an inherent viscosity of 0.10-1.5 dl/g by measurement of a 0.5 g/ml chloroform solution by an Ostwald viscometer at 25° C. and

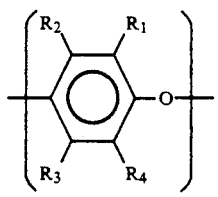
(I)

where $R_1$ to $R_4$ each independently represent hydrogen, chlorine and bromine atoms, a hydrocarbon, substituted hydrocarbon, cyano, alkoxy and phenoxy radicals, 0.05-20% by weight of an active functional-group containing monomer selected from the group consisting of an unsaturated dicarboxylic anhydride, glycidyl methacrylate and diglycidyl tetrahydrophthalate, and (C) 0.5-30 parts by weight of an epoxy compound represented by the formula

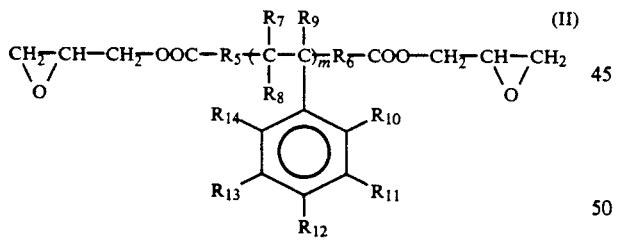
(II)

(where $R_5$ and $R_6$ independently represent a substituted or unsubstituted hydrocarbon radical having 1-40 carbon atoms, $R_7$ to $R_9$ each independently represent a hydrogen atom, or a methyl radical, and $R_{10}$ to $R_{14}$ each independently represent a hydrogen atom, a halogen atom, substituted or unsubstituted hydrocarbon, cyano, alkoxy, phenoxy and nitro radicals; and m being on integer of 0-20.

6. A composition as set forth in claim 5 wherein the aromatic polyester is a polyalkylene terephthalate.

7. A composition as set forth in claim 6 wherein the polyalkylene terephthalate is a polybutylene terephthalate.

8. A composition as set forth in claim 5 wherein the polyphenylene ether is a poly-2,6-dimethyl-1,4-phenylene ether or a poly-2,6-dimethyl-1,4-phenylene ether copolymerized with 2,3,6-trimethylphenylene ether unit.

9. A resin composition comprising:

100 parts by weight of a polyester composition comprised of (A) and (B) as follows (A) 5-95% by weight of an aromatic polyester having an inherent viscosity of 0.7-2.5 dl/g by measurement of a 0.5 g/ml solution of 0-chlorophenol by an Ostwald viscometer at 25° C.

(B) 95-5% by weight of a modified polyphenylene ether having an inherent viscosity of 0.10-1.5 d/g by measurement of a 0.5 g/ml chloroform solution by an Ostwald viscometer at 25° C. and

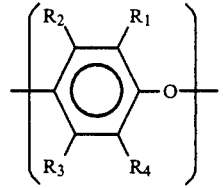
(I)

where $R_1$ to $R_4$ each independently represent hydrogen, chlorine and bromine atoms, a hydrocarbon, substituted hydrocarbon, cyano, alkoxy and phenoxy radicals, 0.3-10 parts by weight of an active functional-group containing monomer having in the molecule both of (a) an aliphatic unsaturated carbon-carbon double bond or triple bond and (b) at least one functional group selected from the group selected from the group consisting of carboxyl, acid anhydride, amide, imide, ester, epoxy, amino, hydroxyl and isocyanate radicals, and (C) 0.05-30 parts by weight of an epoxy compound represented by the formula

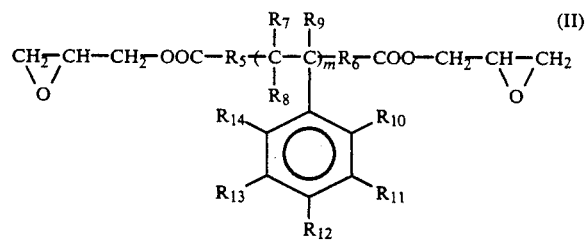
(II)

(where $R_5$ and $R_6$ each independently represent a substituted or unsubstituted hydrocarbon radical having 1-40 carbon atoms, $R_7$ to $R_9$ each independently represent a hydrogen atom, or a methyl radical, and $R_{10}$ to $R_{14}$ each independently represent a hydrogen atom, a halogen atom, substituted or unsubstituted hydrocarbon, cyano, alkoxy, phenoxy and nitro radicals; and m being an integer of 0-20.

* * * * *

UNITED STATES PATENT AND TRADEMARK OFFICE
CERTIFICATE OF CORRECTION

PATENT NO. : 5,006,610

DATED : April 9, 1991

INVENTOR(S) : Kiyokazu Nakamura et al

It is certified that error appears in the above-identified patent and that said Letters Patent is hereby corrected as shown below:

Column 12, line 11, delete "1%".

Signed and Sealed this

Twenty-second Day of September, 1992

Attest:

DOUGLAS B. COMER

Attesting Officer

Acting Commissioner of Patents and Trademarks